United States Patent
Bastani

(10) Patent No.: US 7,673,960 B2
(45) Date of Patent: Mar. 9, 2010

(54) CALIBRATION OF A PRINT HEAD HAVING MULTIPLE DIES

(75) Inventor: Behnam Bastani, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 11/588,244

(22) Filed: Oct. 27, 2006

(65) Prior Publication Data

US 2008/0100658 A1    May 1, 2008

(51) Int. Cl.
*B41J 29/393* (2006.01)

(52) U.S. Cl. .............................. 347/19; 347/6; 347/78

(58) Field of Classification Search ................. 347/19, 347/78
See application file for complete search history.

(56) References Cited

U.S. PATENT DOCUMENTS 5,825,385 A * 10/1998 Silverbrook ................. 347/56
5,847,724 A * 12/1998 Mantell ........................ 347/15
6,851,785 B2   2/2005 Wu et al.
2004/0046820 A1 * 3/2004 Wu et al. ...................... 347/19

FOREIGN PATENT DOCUMENTS

EP    1 473 662    11/2004

* cited by examiner

*Primary Examiner*—Matthew Luu
*Assistant Examiner*—Brian J Goldberg

(57) ABSTRACT

A method, apparatus, and computer program for calibration of a printer having a printed head with multiple dies creates linearization tables that compensate for different drop weight uniformities printed by die-to-die boundaries. The linearization tables are provided to a calibration routine to create an actual linearization table for ink printed by a die-to-die boundary of the print head. The calibration routine creates an actual linearization table by determining a measurement related to drop weight uniformity when the die-to-die boundary of the print head prints the ink. Based on this measurement, a pre-built linearization table is selected for compensating output drop weight and for allowing printing with a substantially uniform drop weight across the die-to-die boundary of the print head.

19 Claims, 9 Drawing Sheets

CALIBRATION OF A PRINT HEAD HAVING MULTIPLE DIES

FIELD OF THE INVENTION

This invention relates to the field of printing, and more particularly to the field of printer calibration wherein the printer comprises a print head having more than one die.

BACKGROUND

Printer calibration has become an important topic as print resolution and reproduction accuracy improve in printers.

Calibration is used to compensate for reproduction inconsistencies that may arise due to manufacturing variations in ink drop weight, ink chemistry and the environmental effects of temperature and humidity on the printing process. For example, ink drop weight produced by different print heads often varies as a result of minute manufacturing differences in the size of the nozzles used in an inkjet print head, different resistor characteristics in the heater element used to eject the ink droplets in the inkjet print head, variations in the orifice shape, or any other difference from one print head to another. Differences in the ink chemistry combined with temperature and humidity also affect the final color appearance when applied to a print medium. To accommodate these factors, it is known to employ color calibration which modifies the number of ink drops during printing to make color printing more consistent.

Reproduction inconsistencies are not, however, simply limited to color. Non-uniformity in printing can also be caused by factors such as aerodynamic variations, temperature fluctuations within print dies and minor misalignment between adjacent print dies. This non-uniformity is especially evident in printers that have more than two dies, and increases with the number of print dies used by a printer. As illustrated in FIG. 1, such misalignment can also be visible as a light area (10) corresponding to a die-to-die boundary and is known as Light Area Banding (LAB).

Known methods and systems for compensating such non-uniformities have typically focused on directly addressing its causes. For example, it is Known to use different masking on die boundaries in an attempt to reduce aerodynamic fluctuations. Currently, no proposals have been made that seek to address the problem of temperature fluctuations.

Some known printers employ a pen alignment procedure which is supposed to correct misalignment between dies. However, due to noise in the system a non-zero value of misalignment still remains after such a pen alignment procedure. This value of misalignment may be larger when a known alignment procedure known as Automatic Pen Alignment (APA) is used to align dies in particular printers. Further, the model used in APA procedure is not perfect and there exist other effects such as media curl and ambient light that add to and alter the noise in the system.

It is therefore desirable to develop a calibration technique to cater for printing non-uniformity at die-to-die boundaries of a print head and to improve printing quality and/or accuracy.

Previously, different print masks have been used to hide the misalignment artifacts. Although using different masks can be useful in making misalignment less apparent, it cannot completely eliminate misalignment artifacts.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
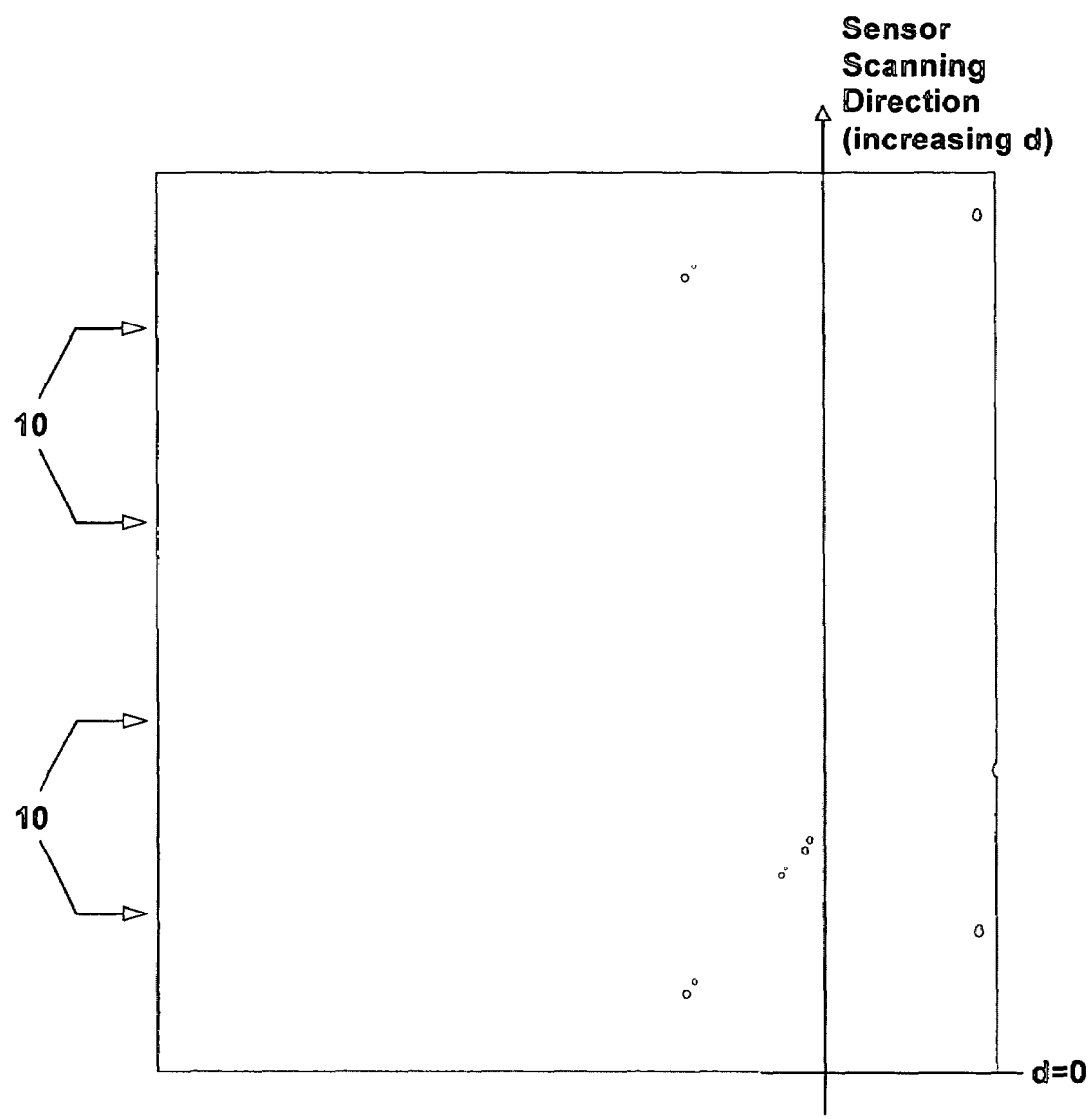
FIG. 1 illustrates the phenomenon of Light Area Banding (LAB) due to printing non-uniformities at die boundaries.

According to an aspect of the invention, there is provided a method of creating linearization tables used in printer calibration, the printer having a print head with more than one die, wherein the method comprises the steps of: receiving drop weight uniformity related measurements for an ink printed by a printer die with at least two die-to-die boundaries; selecting at least two die-to-die boundaries that deliver different drop weight uniformities when printing with the ink; generating intermediate linearization tables corresponding to the at least two die-to-die boundaries that compensate for different drop weight uniformities printed by the at least two die-to-die boundaries; and providing the intermediate linearization tables and associated drop weight uniformity information to a calibration routine to create a final linearization table for the ink printed by a die-to-die boundary of the print head.

According to another aspect of the invention, there is provided a method of calibrating a printer output at a die-to-die boundary of a print head, comprising: determining a measurement related to drop weight uniformity when the die-to-die boundary of the print head prints the ink; and selecting an intermediate linearization table from a set of intermediate linearization tables that compensate for different drop weight uniformities printed by a die-to-die boundary, based on the measurement related to drop weight uniformity of the die-to-die boundary of the print head.

According to yet another aspect of the invention, there is provided an apparatus for calibrating a die-to-die boundary of a print head having more than one die using linearization, wherein the apparatus comprises: sensor means for determining a measurement related to drop weight uniformity when the die-to-die boundary of the print head prints the ink; selection means for selecting an intermediate linearization table from a set of intermediate linearization tables that compensate for different drop weight uniformities printed by a die-to-die boundary, based on the measurement related to drop weight uniformity of the die-to-die boundary of the print head.

According to yet another aspect of the invention, there is provided a computer program comprising computer program code means adapted to perform a method of creating linearization tables used in printer calibration according to the invention.

According to further aspect of the invention, there is provided a computer program comprising computer program code means adapted to perform a method of calibrating an ink printed by a die-to-die boundary of a print head according to the invention.

Thus, the invention enables calibration of a printer to compensate or cater for printing non-uniformity at die-to-die boundaries of a print head. Accordingly, the invention can help to improve printing quality and/or accuracy.

Because the invention caters for undesirable artifacts caused by non-uniformities occurring at die-to-die boundaries, the need for engineers to consider the complex interactions between aerodynamic effects, thermal variations, and die misalignments may be lessened. Rather than having to research all of the causes of die boundary non-uniformities, the invention addressed the problem of non-uniformities by treating is a change in printing drop weight.

Examples of the invention provide a method, apparatus, and computer program for calibrating a printer having a print head with multiple dies. Linearization tables that compensate for different drop weight uniformities printed by die-to-die boundaries are created (i.e. pre-built), and these linearization tables are provided to a calibration routine for creating an actual linearization table for ink printed by a die-to-die boundary of the print head. The calibration routine creates an actual linearization table by determining a measurement related to drop weight uniformity when the die-to-die boundary of the print head prints the ink. This determined measurement is then compared with measurements related to drop weight uniformity of the other die-to-die boundaries which are each associated with a pre-built linearization table. Based on the comparison, a pre-built linearization table can then be selected for compensating output drop weight and for allowing printing with a substantially uniform drop weight across the die-to-die boundary of the print head.

Figure 2:
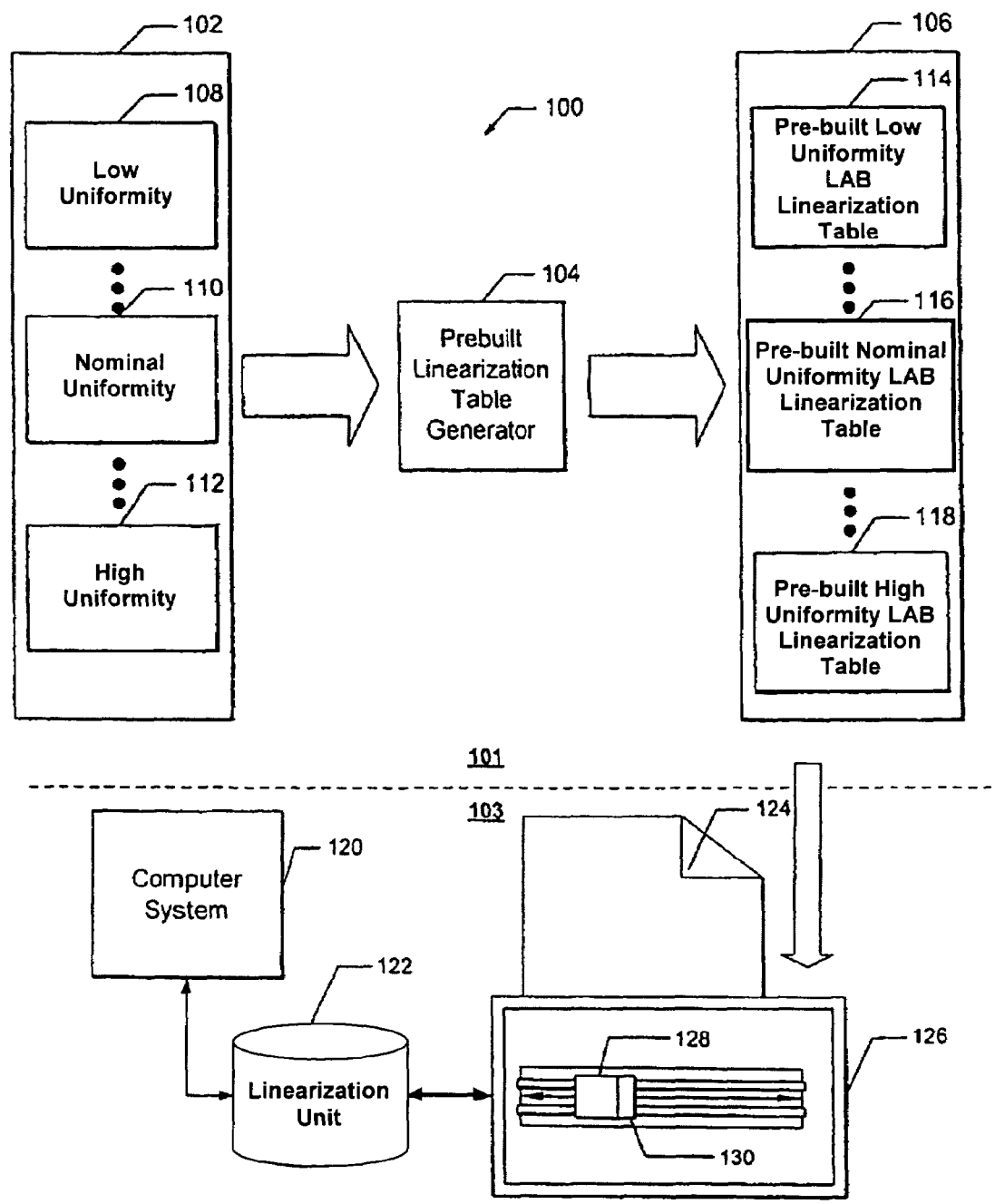
FIG. 2 is a block diagram of a printing system according to an embodiment of the invention.

FIG. 2 is a block diagram of a printer calibration system according to a first embodiment of the invention. The system 100 has an offline portion 101 that is adapted to operate prior to calibrating the printer and has an online portion 103 which is used when a print head and printer combination is calibrated. For example, the offline portion 101 includes operations and systems typically employed during manufacture or design. The online portion 103 includes operations that are typically performed when a printer calibration is requested.

The offline portion 101 in FIG. 2 includes a group of die-to-die boundary uniformity measurements 102 for representing Light Area Bands (LABs) created by die boundaries, a pre-built linearization table generator 104, and pre-built LAB linearization tables 106. The group of boundary uniformity measurements 102 include a representative set of uniformity related measurements that print different ink drop weight uniformities for a die-to-die boundary, ranging from a die-to-die boundary having a low drop-weight uniformity 108 (i.e., low uniformity 108), a die-to-die boundary having a nominal drop-weight uniformity 110 (i.e., nominal uniformity 110), and a die boundary with a high uniformity 112 (high Is uniformity 112). Each set of uniformity measurements in the group of die-to-die boundary uniformity measurements 102 may be individually created and modified as necessary.

To accommodate for printing non-uniformity at die boundaries, and to improve printing quality and/or accuracy, an embodiment of the present invention selects the uniformity related measurements of low uniformity 108, nominal uniformity 110, and high uniformity 112. The linearization table generator 104 creates a number of pre-built LAB linearization tables from the selected uniformity related measurements. In the particular implementation described, the group of pre-built LAB linearization tables 106 includes a pre-built low uniformity LAB linearization table 114, a pre-built nominal uniformity LAB linearization table 116, and a pre-built high uniformity LAB linearization table 118. For increased accuracy, alternate implementations can use a greater number of uniformity related measurements from the group of die-to-die boundary uniformity measurements 102 and create a correspondingly greater number of pre-built LAB linearization tables in the group of pre-built linearization tables 106.

The group of pre-built linearization tables 106 created in the offline portion 101 is used in the online portion 103 when printer calibration is requested or desired. The online portion 103 of FIG. 1 comprises a computer system 120, a linearization unit 122, a printer 126 having a print head 128 comprising multiple dies and a sensor 130, and a medium 124 for printing. As illustrated, the linearization unit 122 can be accessed by the computer system 120 and the printer 126.

It will be understood that, in alternative embodiments, the linearization unit 122 can be implemented directly by or within the computer system 120 and/or the printer 126 depending on specific design requirements. Similarly, the pre-built LAB linearization tables 106 of the offline portion 101 may be stored by the printer 126 or the computer system 120. Furthermore, a calibration routine in accordance with the present invention may be executed on a processor within computer system 120, the printer 126 or any combination thereof.

In operation, printer 126 prints a test patch (similar to that shown in FIG. 1) in a predetermined ink using the multiple dies of the print head 128 and then uses sensor 130 to scan across the printed test patch and measure the ink drop weight printed on medium 124 in terms of L* in the CIE L*a*b* color space. CIE L*a*b* color space is a color space in which variation in any part of the space is perceived as uniform. The sensor 130 may be an light sensor, such as an LED-based diffuse sensor, that is provided in the printer 126. The L* measurement made by sensor 130 is plotted against displacement d of the sensor to provide a graph such as that shown in FIG. 3. Here, L* is used since variations in the graph are assumed to be due to drop weight variations, thereby meaning the hue of the printed ink does not change.

Figure 3:
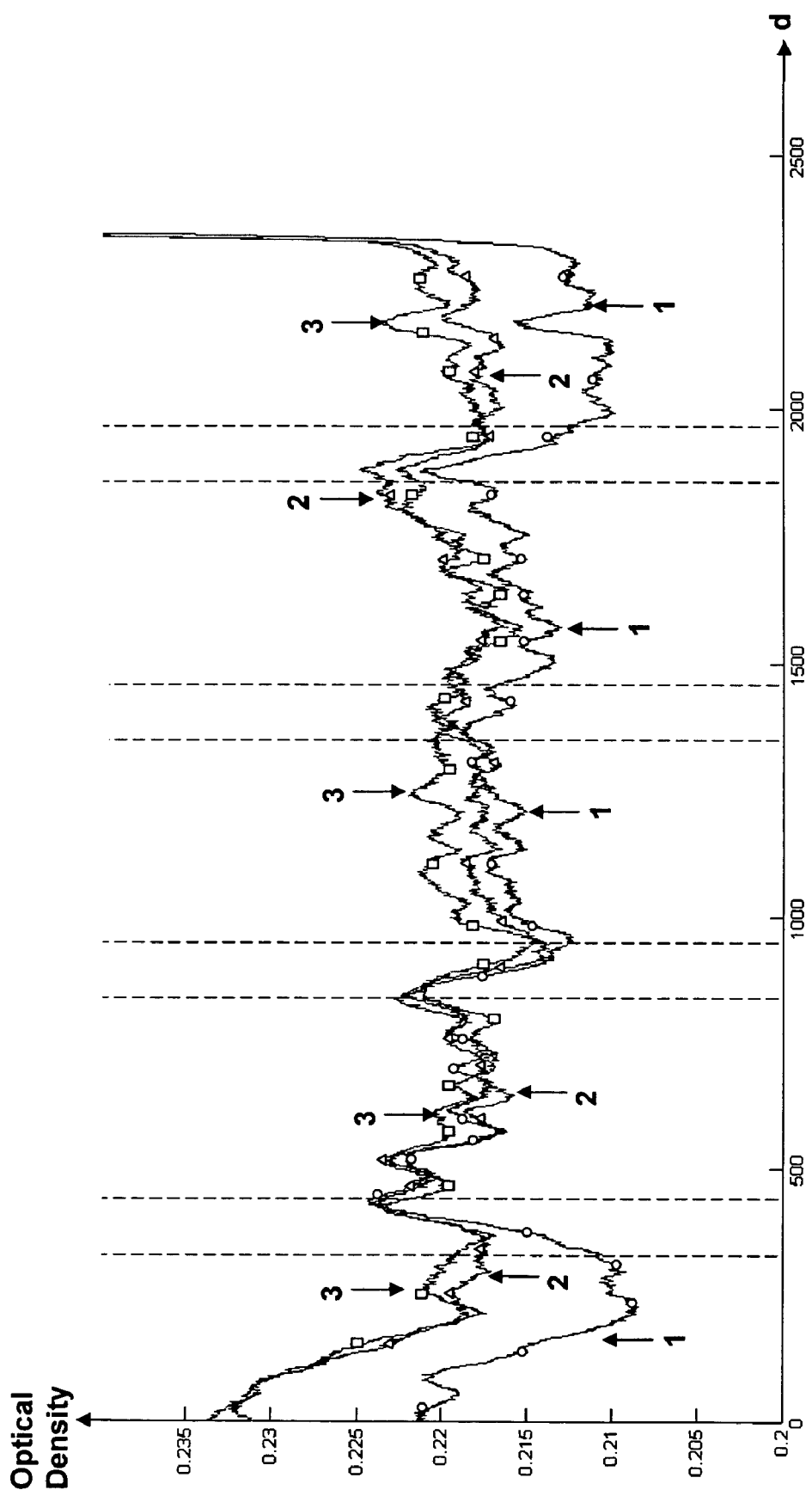
FIG. 3 is a graph depicting example relationships between sensor displacement and measured optical density obtained by the sensor of FIG. 2.

Referring to FIG. 3, the illustrated graph shows measurements obtained by the sensor for first to third test patches, each test patch being roughly similar to that shown in FIG. 1. LABs present in the test patch, and caused by non-uniformities at die boundaries, can be detected in the graph of L* against sensor displacement d as peaks in the value of L*. In FIG. 3, the dashed lines indicate the nominal locations of the LABs, wherein a nominal location of a LAB is generally at the center of a die-to-die boundary or overlap. Thus, it is noted that the detected positions of the LABs are sometimes shifted towards the lighter of two adjacent or overlapping dies.

Here, it is assumed that a LAB may have a Gaussian shape when its variation in optical density L* is plotted against displacement d. Thus, the centre of a LAB generally corresponds to a peak or maximum value of optical density (or minimum value of drop volume).

Using the sensor measurements, the linearization unit 122 detects the LABs as peaks in the value of L*, and determines the size of the peak. The size of L* peak is proportional to the magnitude of the non-uniformity between aies, and therefore indicates the visibility of the LAB. A large peak in the detected L* values indicates a region of high optical density (low drop volume) compared to its immediate surroundings (i.e. a low uniformity between dies), whereas a small peak in the detected L* value indicates a region having a similar optical density to its immediate surroundings (i.e. a high uniformity between dies).

The determined peak sizes are compared with the uniformity related measurements of low uniformity 108, nominal uniformity 110, and high uniformity 112, respectively, to identify a suitable pre-built LAB linearization table for adjusting the drop weight properties of the die boundary to cater for the magnitude of the die-to-die non-uniformity. In other words, a suitable pre-built LAB linearization table is selected according to the detected magnitude or visibility of LAB. The selected pre-built LAB linearization table is then used to adjust the printing properties of the print head at the die-to-die boundaries. In this way, the drop volume of the nozzles at the corresponding die-to-die boundary can be adjusted to remove or reduce the magnitude of the detected LAB, wherein the drop volume of the nozzles outside of the die-to-die boundary is not modified.

It will be appreciated that selection of only one of the pre-built LAB linearization tables may not necessarily completely remove the detected LAB. For example, a detected peak size of, say, eight units may indicate a low uniformity die-to-die boundary and, therefore, the pre-built LAB linearization table 114 for compensating a low uniformity boundary may be selected. However, the pre-built LAB linearization table 114 for compensating a low uniformity boundary may have been generated to fully compensate a low uniformity die boundary corresponding to a peak size of ten units. Thus, use of the pre-built LAB linearization table 114 will result in over compensation of the drop volume and result in a finite non-uniformity between the corresponding die boundaries (i.e. a dark area band, DAB). To cater for this problem, which is associated with the use of a small or finite number of linearization tables 106, interpolation between selected pre-built LAB linearization tables 106 can be employed. To achieve this, an interpolation factor may be used to interpolate between two selected pre-built LAB linearization tables 106 and produce a final linearization table for the print head.

In general, the role of a final linearization table is to receive an input drop weight for printing an ink and provide a compensated output drop weight calculated to print with a substantially uniform optical density across the corresponding die-to-die boundary of a print head.

Figure 4:
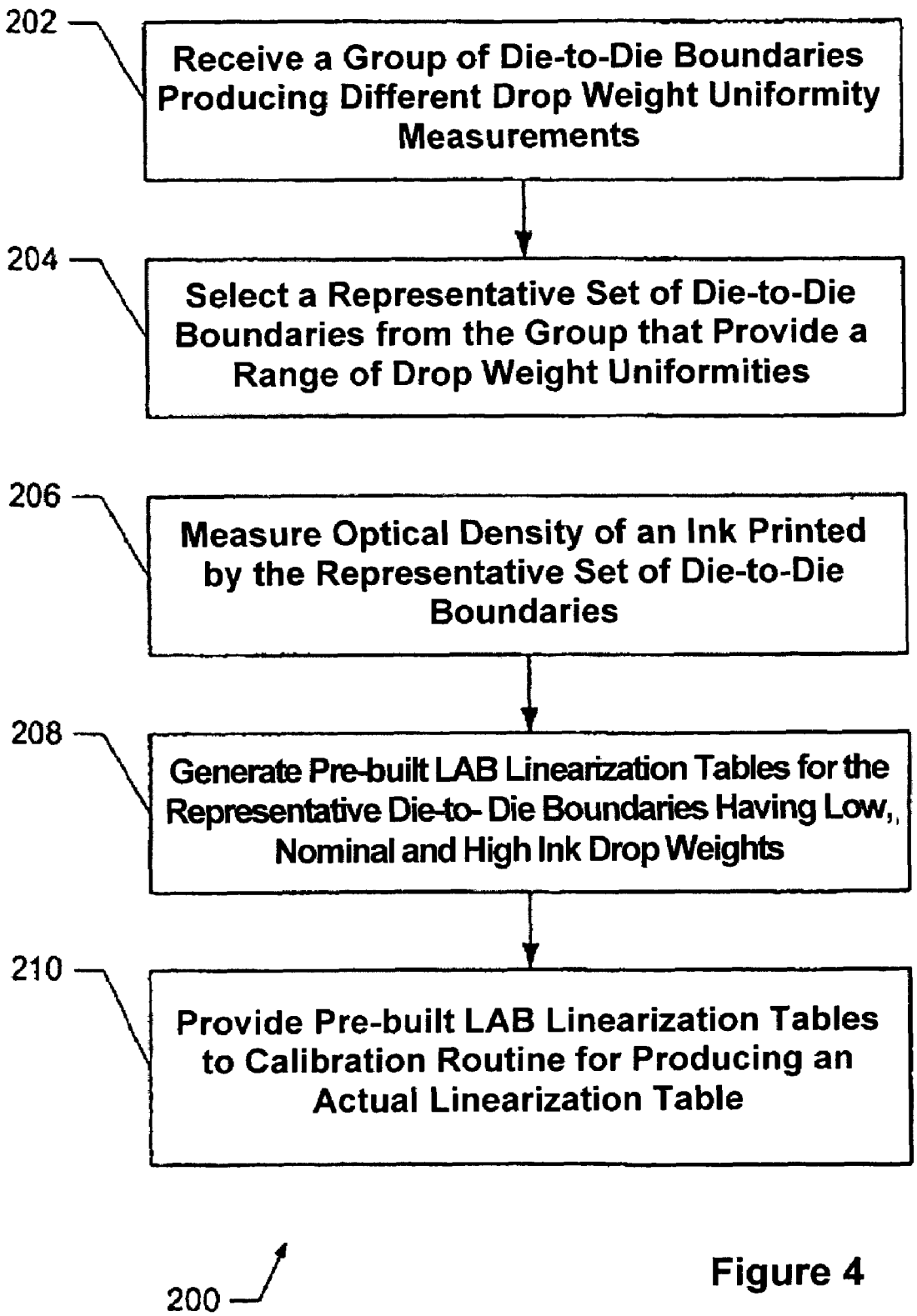
FIG. 4 is a flow chart diagram of a method for creating pre-built linearization tables in accordance with an embodiment of the invention.

FIG. 4 is a flow chart diagram of the operations for creating pre-built LAB linearization tables in accordance with an embodiment of the invention. Firstly, a group of die-to-die boundaries producing different drop weight uniformity measurements is manufactured (202). Printing inconsistencies such as non-uniformities at die-to-die boundaries may be attributed to manufacturing tolerance and misalignment between the dies.

Based upon the properties of the die-to-die boundaries, a representative set of die-to-die boundaries is selected and categorized based on the different ink drop weight uniformities produced by the die-to-die boundaries (204). For example, in an example embodiment of the invention, three die-to-die boundaries are selected representing a low uniformity boundary, a nominal uniformity boundary, and a high uniformity boundary. Of course, more than three uniformity values can also be used in the representative set. The number of uniformity values selected may depend on design constraints such as production costs and the required accuracy when calibrating the primary inks. For example, using more uniformity values may increase the costs and processing time required to perform the calibration but can increase the accuracy of the calibration process. Of course, two uniformity values could be employed to reduce costs and processing requirement, but this is likely to provide a less accurate calibration.

A measurement device measures one or more print samples of ink printed by the representative set and determines values related to the optical density of the ink printed by the die-to-die boundaries (206). The print samples are created by first printing a test patch. For example, a primary ink would be printed as a block of colour traversing the boundary of the adjacent dies. Accordingly, a four ink CMYK (i.e., cyan, magenta, yellow, black) color printer would involve the printing of four color blocks traversing the dies, and a six ink CcMmYK (i.e., cyan, light-cyan, magenta, light-magenta, yellow, black) color printer would require six color blocks. The test patch for the ink may then be measured using a suitable measuring device, such as a spectrophotometer or a densitometer for example.

The measurement information associated with each of the representative uniformity values is used to create corresponding pre-built LAB linearization tables (208). Generally, these pre-built LAB linearization tables are generated once for each print head design and may be used to capture a typical range of die-to-die boundary variations in the print head operation and performance.

It will be understood that the pre-built LAB linearization tables can be created offline at specific time intervals or recreated for each new lot of print heads manufactured. If the print heads in different manufacturing lots vary, recreating the pre-built LAB linearization tables for different manufacturing lots may help to improve overall calibration accuracy.

Once the pre-built LAB linearization tables are created, they are provided along with any supporting measurements to a calibration routine designed in accordance with the invention where they may be used to modify existing linearization tables and adjust print drop weights at die-to-die boundaries. In this way, the pre-built LAB linearization tables can be used to determine actual linearization tables for inks printed by a die-to-die boundary of a print head (210). Furthermore, the pre-built LAB linearization tables may be interpolated.

By creating several pre-built LAB linearization tables, a print head comprising multiple dies may be calibrated online without printing a large number of test patches or performing corresponding complex measurements. Estimation of the actual linearization table required to compensate for non-uniformities can achieved using the pre-built LAB linearization tables, and the accuracy of such estimation may be further improved using interpolation between the pre-built LAB linearization tables. Thus, the invention may provide the accuracy necessary for calibration whilst eliminating the need to print and measure a large number of test patches.

Figure 5:
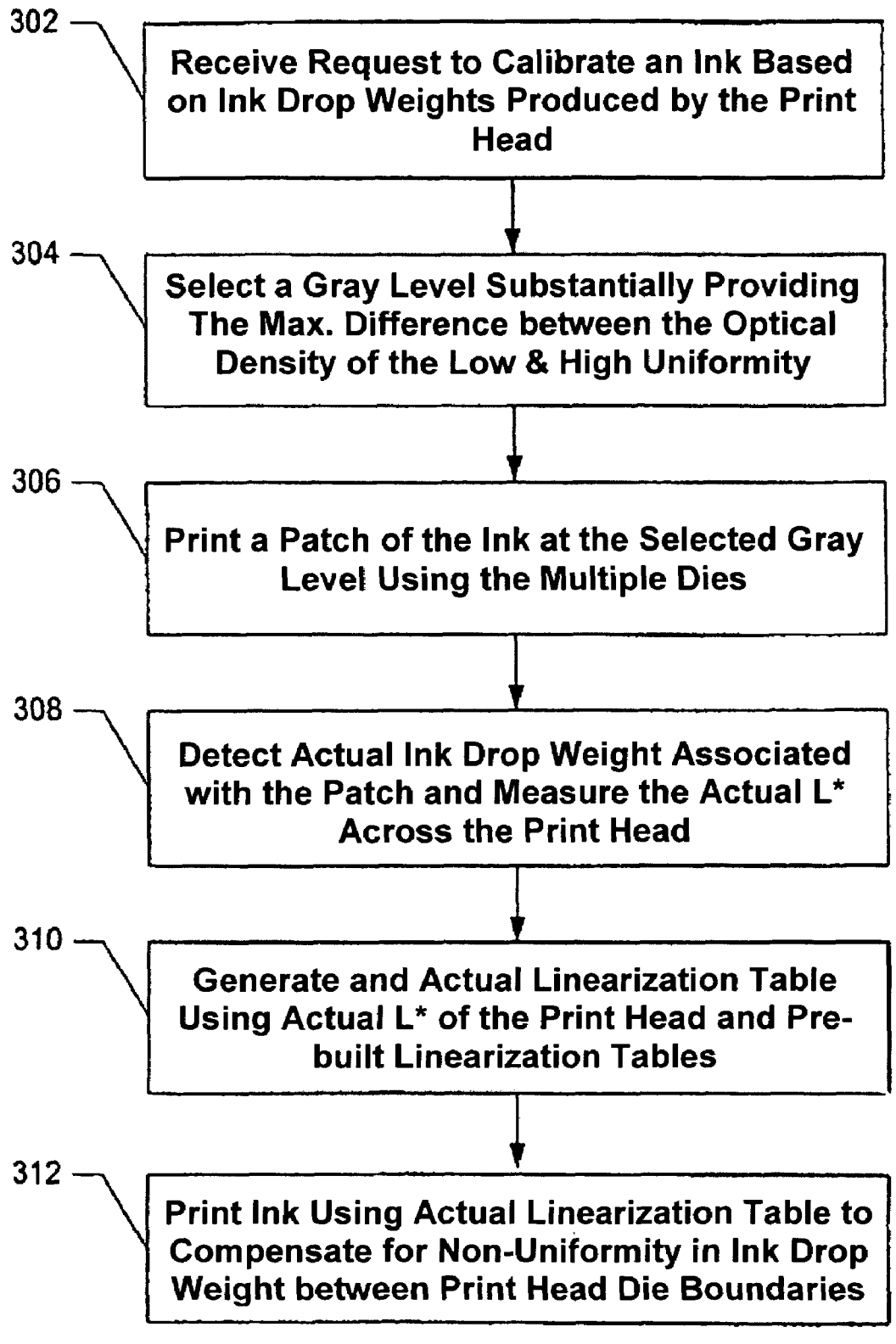
FIG. 5 is a flow chart diagram of a method for performing printer calibration according to an embodiment of the invention.

FIG. 5 is a flow chart diagram of the operations associated with performing a printer calibration according to an embodiment of the invention. A request to calibrate a print head typically occurs when a printer is first used, a new print head is installed, or the occurrence of other events that may affect the amount of ink delivered by the print head (302). For example, a printer calibration may be helpful after a printer has been jarred during shipping and/or delivery. The calibration may also be useful to perform periodically as a print head ages and the ink ejection characteristics of the print head changes. Further, the calibration techniques can also be part of a larger set of routines used to calibrate other aspects of the printer or perform setup operations on the printer.

The calibration operation selects a color density at which there is a maximum difference between the optical density of the high and low uniformity values (304). This difference in optical density is determined by comparing L* measurements across a die-to-die boundary having low uniformity or high uniformity at various gray levels. By selecting the gray level providing this maximum difference, the dynamic range being measured is increased and errors caused by inaccuracies of the embedded sensor may be reduced. The size of an L* peak at the selected gray level for the low uniformity boundary is referred to as "pre-built L* low" and for the high uniformity boundary is referred to as "pre-built L* high". For the nominal uniformity boundary, the value of L* at the selected gray level is referred to as "pre-built L* nominal". These values are used later for determining an actual linearization table for the print head being calibrated and are also further described with reference to the method illustrated by FIG. 7.

Accordingly, a test patch extending across multiple dies of the print head is printed at the selected gray level described above (306). The test patch may be printed for each primary ink, or may alternatively be printed for one primary ink. It is generally preferable to reduce the number or patches to be printed in order to save time and resources.

An embedded sensor associated with the printer scans across the printed test patch and measures the ink drop weight of the printed test patch (308) in terms of L*. The measured values of L* can then be plotted against sensor displacement d to obtain a graph similar to that shown in FIG. 3.

An actual value of L* can be calculated based on the measurements made by the embedded sensor processed using a predefined conversion formula. Of course, alternative terms other than L* can be used to represent optical density of a printed ink. For example, yellow can be represented using the b* term in the CIE L*a*b* color space to accommodate for the relatively lower dynamic range of L* associated with the color yellow.

The calibration uses the pre-built LAB linearization tables to create actual linearization tables based on detected variation of L* across the printed test patch and the pre-built LAB linearization tables (310).

A comparison between a detected size of an L* peak for the ink being calibrated and the pre-built L* measurements determines which one of the pre-built linearization tables is used to produce the appropriate actual linearization table for the ink being calibrated. For example, if the detected size of a an L* peak is ten units, and the size of an L* peak for a low drop weight uniformity boundary, a nominal drop weight uniformity boundary and a high drop weight uniformity boundary is twelve units, six units and one unit, respectively, the pre-built L* low values are used to produce an actual linearization table because the detected L* peak size (ten units) corresponds most closely to that that of a low drop weight uniformity boundary (twelve units).

The resulting actual linearization table is used to print a primary ink and compensate for variations in optical density (312).

An alternative option to simply using one of the pre-built linearization tables for generating an actual linearization table will now be explained with reference to FIGS. 6a and 6b.

Figure 6A:
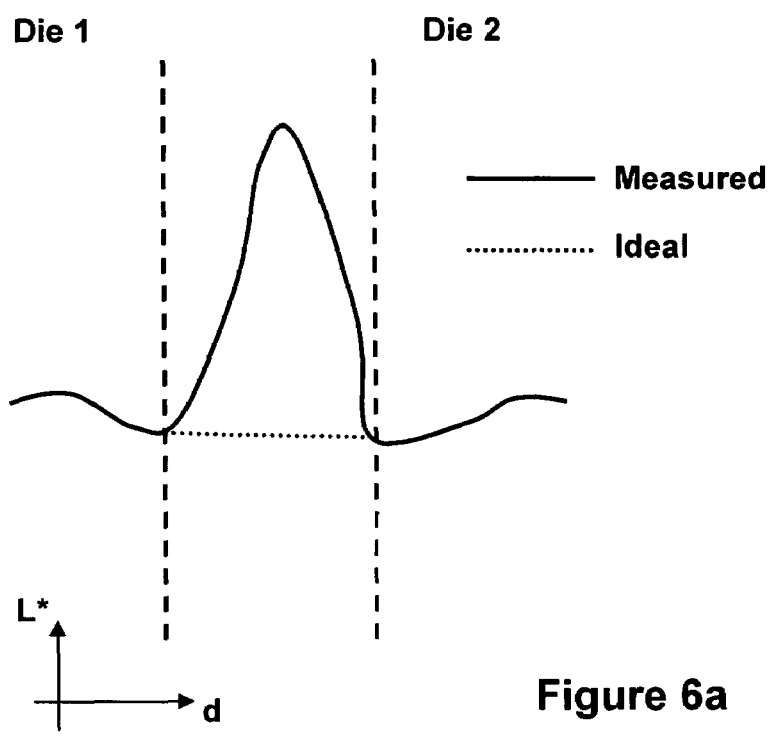
FIG. 6a shows a graph depicting an example relationship between sensor displacement and measured optical density for a test patch printed by a die-to-die boundary.

Referring to FIG. 6a, the illustrated graph shows detected values of L* with respect to sensor displacement d across a printed test patch. The test patch has been printed by a print head comprising first (DIE 1) and second (DIE 2) dies. Thus, a LAB is present in the test patch which is caused by non-uniformities across the die-to-die boundary. The relative position of the die-to-die boundary is indicated by parallel vertical dashed lines and this is where the nominal location of a LAB can be expected to occur. Indeed, the graph of L* against sensor displacement d has a peak in the value of L* which corresponds generally with the position of the die-to-die boundary.

The dotted line in the graph of FIG. 6a indicates the values of L* with respect to sensor displacement for a substantially ideal die-to-die boundary. That is, for a die-to-die boundary that has a high level of uniformity or substantially uniform printing characteristics, plotted values of L* across such a boundary will form a generally straight line between the dies (wherein the value of L* across the test patch outside of the die-to-die boundary is assumed to be substantially uniform).

From FIG. 6a, it may be assumed a LAB has a Gaussian shape when its variation in brightness L* is plotted against displacement d. Thus, as detailed above, the centre of a LAB generally corresponds to a peak or maximum value of optical density (or minimum value of drop volume).

Using the detected variation of L* across the die-to-die boundary, the size of the L* peak can be detected. The size of an L* peak is proportional to the magnitude of the non-uniformity between dies, and therefore indicates the visibility of the LAB. A large peak in the detected L* value indicates a region of high optical density (low drop volume) compared to its immediate surrounds (i.e. a low drop weight uniformity across a die-to-die boundary), whereas a small peak in the detected L* value indicates a region having a similar optical density to its immediate surroundings (i.e. a high drop weight uniformity across a die-to-die boundary).

The determined peak size is then compared with predetermined uniformity values to identify a suitable pre-built LAB linearization table for adjusting printing properties at the die-to-die boundary to cater for the magnitude of the detected non-uniformity. In other words, a suitable pre-built LAB linearization table is selected according to the detected magnitude or visibility of the LAB. The selected pre-built LAB linearization table is then used to adjust the printing properties of the print head at the die-to-die boundary by generating an actual linearization table (otherwise referred to as a final linearization table). Thus, the drop volume of the nozzles at the corresponding die-to-die boundary can be adjusted to remove or reduce the magnitude of the detected LAB.

It will be appreciated that selection of only one of the pre-built LAB linearization tables may not necessarily completely remove the detected LAB.

Figure 6B:
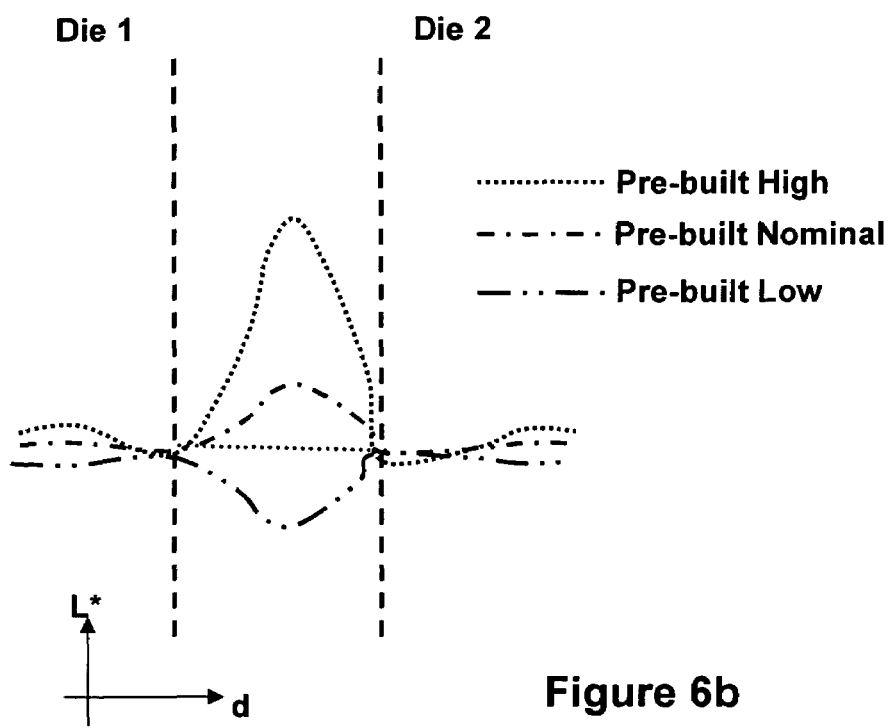
FIG. 6b shows a graph depicting example relationships between sensor displacement and measured optical density for first to third printed test patches printed by a die-to-die boundary after calibration using first to third pre-built LAB linearization tables.

For example, referring to FIG. 6b, the illustrated graph shows detected values of L* with respect to sensor displacement d across first to third printed test patches after calibration using first to third pre-built LAB linearization tables. It can be seen from the plotted values of L* that amount by which the peak size has been reduced depends on the pre-built LAB linearization table selected to calibrate the die-to-die boundary of the print head.

The dotted line denoted "Pre-built High" shows the result of calibration using the pre-built high uniformity LAB linearization table (i.e. generated using pre-built L* high). Since the values of this pre-built LAB linearization table have been generated to compensate for a die-to-die boundary having high drop weight uniformity, the magnitude by which it has modified the printing properties at the boundary is small. Thus, the calibration procedure using this table has not introduced adequate compensation and a large L* peak remains, indicating the existence of a highly visible LAB.

The dashed-dotted line denoted "pre-built nominal" shows the result of calibration using the pre-built nominal uniformity LAB linearization table (i.e. generated using pre-built L* nominal). Since the values of this pre-built LAB linearization table have been generated to compensate for a die-to-die boundary of nominal drop weight uniformity, the magnitude by which it has modified the printing properties at the boundary is medium and the size of the L* peak has been reduced. However, the calibration procedure using this table has not introduced adequate compensation and an L* peak of finite size remains, indicating the existence of a visible LAB.

The dashed-double-dotted line denoted "pre-built low" shows the result of calibration using the pre-built low uniformity LAB linearization table (i.e. generated using pre-built L* low). Since the values of this pre-built LAB linearization table have been generated to compensate for a die-to-die boundary of low drop weight uniformity, the magnitude by which it has modified the printing properties at the boundary is high and the L* peak has been transformed into a downward peak (i.e. a trough). Thus, the calibration procedure using this table has introduced excessive compensation and now an L* trough of finite size remains, indicating the existence of a visible DAB.

It will therefore be appreciated that, although the invention can be used to remove or reduce the magnitude of non-uniformities at die-to-die boundaries, it may be preferable to include a further step of interpolating between selected pre-built LAB linearization tables. In such an additional step, an interpolation factor may be used to interpolate between selected pre-built LAB linearization tables and produce a final linearization table for the print head.

Figure 7:
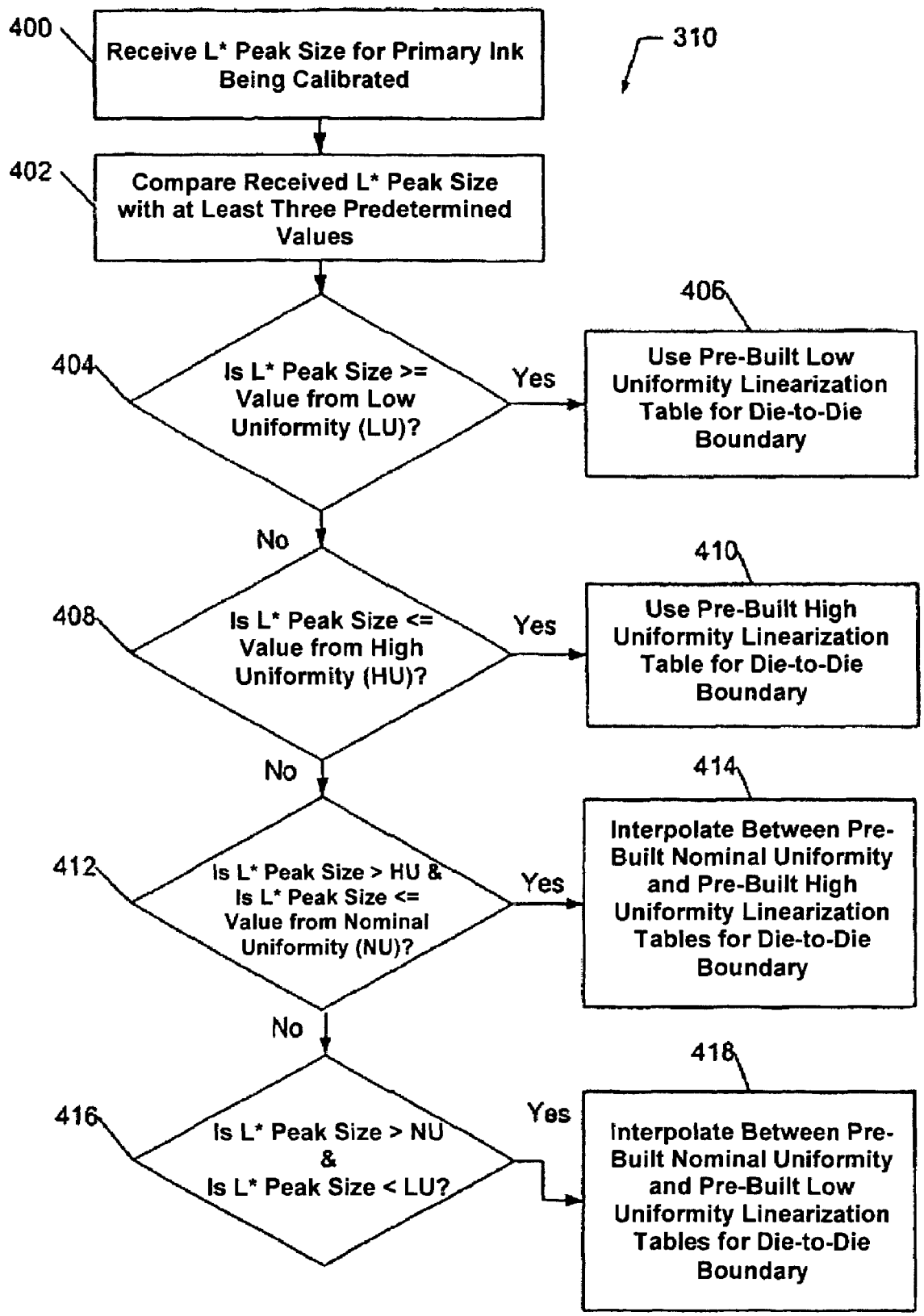
FIG. 7 is a flow chart diagram of the operations associated with generating an actual linearization table according to an embodiment of the invention.

FIG. 7 is a flow chart diagram of the operations for generating an actual/final linearization table in accordance with an embodiment of the invention. The L* peak size is measured for the ink being calibrated when it is printed at the selected gray level (400). As previously described, the color density is selected to substantially correspond to a color density value at which there is a maximum difference in the L* peak size measurements for low and high uniformity die-to-die boundaries.

The measured L* peak size is then compared with three pre-determined values corresponding to low, nominal, and high drop weight uniformity die-to-die boundaries (402). It should be understood that it is not essential to use three predetermined values. Alternative embodiments may use two or more predetermined or pre-built peak-size values depending on the required calibration accuracy and technical constraints such as processing limitations.

If the L* peak is equal or greater than the pre-built L* peak size (pre_built_low) of a low drop weight uniformity die-to-die boundary (404), the invention uses a pre-built low uniformity LAB linearization table (LowU_LAB) for generating the corresponding die-to-die boundary values in the actual linearization table of the print head being calibrated (406).

Otherwise, the method continues to step 408 in which it is determined whether or not the L* peak size is less than or equal to the pre-built L* peak size (pre_built_high) of a high drop weight uniformity die-to-die boundary.

If the L* peak size is less than or equal to the pre-built L* peak size (pre_built≦high) of a high drop weight uniformity die-to-die boundary, the invention uses a pre-built high uniformity LAB linearization table (HighU_LAB) for generating the corresponding die-to-die boundary values in the actual linearization table of the print head being calibrated (410). Otherwise, the method continues to step 412 in which it is determined whether or not the L* peak size is greater than the pre-built L* peak size (pre_built_high) of a high drop weight uniformity die-to-die boundary and less than or equal to the pre-built L* peak size (pre_built_nom) of a nominal drop weight uniformity die-to-die boundary.

If the result of the determination undertaken in step 412 is true, the invention interpolates between the pre-built high uniformity LAB linearization table (HighU_LAB) and a pre-built nominal uniformity LAB linearization table (NomU_LAB) to generate the corresponding die-to-die boundary values in the actual linearization table of the print head being calibrated (414). Otherwise, if the result of the determination undertaken in step 412 is false, the method continues to step 416.

More specifically, in step 414, the interpolation operation determines an interpolation factor F where F=(L* peak size−pre_built_high)/(pre_built_nom−pre_built_high). This interpolation factor is used to generate the corresponding die-to-die boundary values $T_{boundary}$ in the actual linearization table T of the print head being calibrated, where:

$$T_{boundary} = \text{High}U\_\text{LAB} + F * (\text{Nom}U\_\text{LAB} - \text{High}U\_\text{LAB}).$$

In the step 416, it is determined that the L* peak size must be greater than the pre-built L* peak size (pre_built_nom) of a nominal drop weight uniformity die-to-die boundary and must also be less than the pre-built L* peak size (pre_built_low) of a low drop weight uniformity die-to-die boundary. The method thus continues to step 418 in which the invention interpolates between the pre-built nominal uniformity LAB linearization table (NomU_LAB) and the pre-built low uniformity LAB linearization table (LowU_LAB) to generate the corresponding die-to-die boundary values in the actual linearization table of the print head being calibrated (414).

More specifically, in step 414, the interpolation operation determines an interpolation factor F where F=(L* peak size−pre_built_nom)/(pre_built_low−pre_built_nom). This interpolation factor is used to generate the corresponding die-to-die boundary values $T_{boundary}$ in the actual linearization table T of the print head being calibrated, where:

$$T_{boundary} = \text{Nom}U\_\text{LAB} + F * (\text{Low}U\_\text{LAB} - \text{Nom}U\_\text{LAB}).$$

Figure 8:
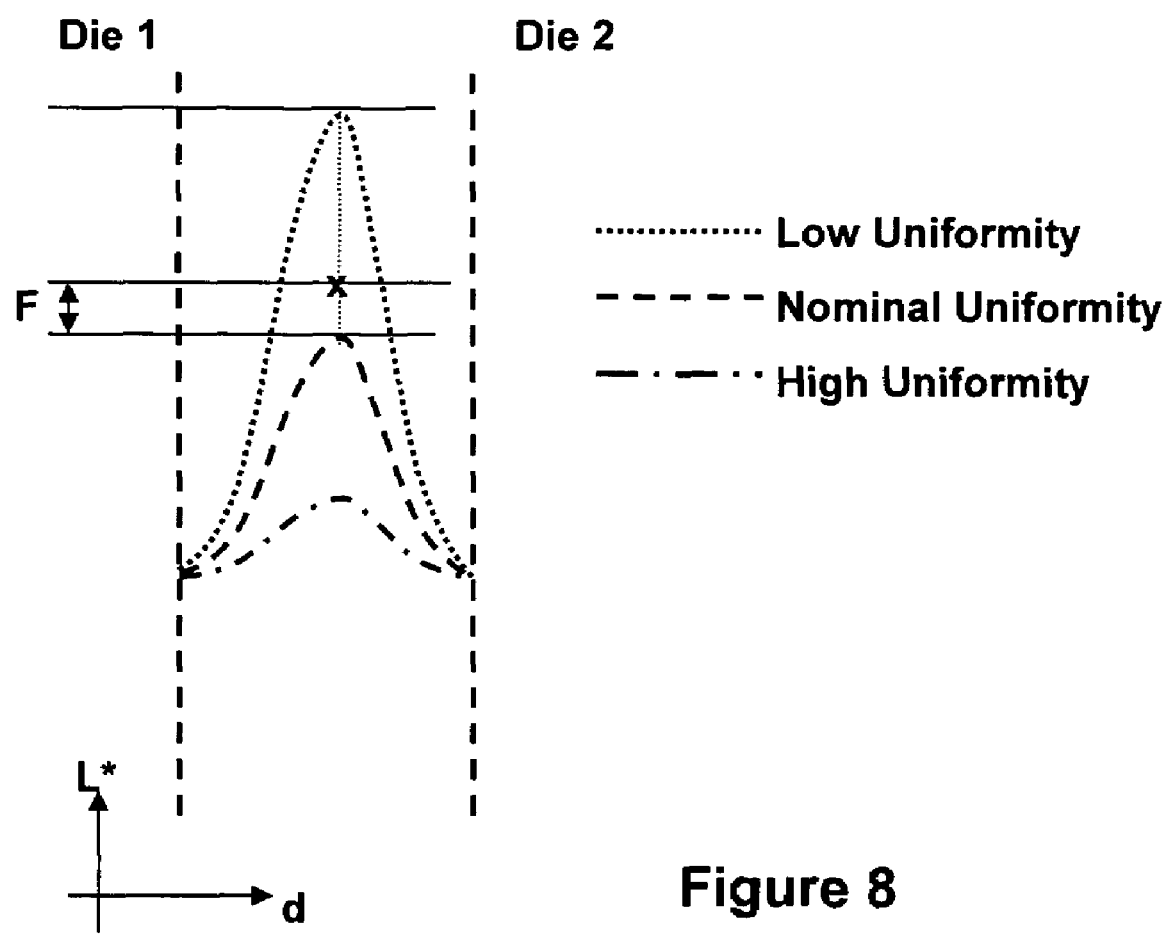
FIG. 8 shows a graph depicting example relationships between sensor displacement and measured optical density of first to third printed test patches printed by first to third die-to-die boundaries for which first to third pre-built LAB linearization tables are designed to compensate.

FIG. 8 depicts the values of L* with respect to sensor displacement for die-to-die boundaries which three pre-built LAB linearization tables are designed to compensate. The dotted line depicts values of L* against displacement d measured across a die-to-die boundary having low drop weight uniformity and for which the pre-built low uniformity LAB linearization table (LowU_LAB) is calculated to compensate for.

Similarly, the dashed line depicts values of L* against displacement d measured across a die-to-die boundary having nominal drop weight uniformity and for which the pre-built nominal uniformity LAB linearization table (NomU_LAB) is calculated to compensate. Further, the dashed-dotted line depicts values of L* against displacement d measured across a die-to-die boundary having high drop weight uniformity and for which the pre-built high uniformity LAB linearization table (HighU_LAB) is calculated to compensate.

Using sensor measurements of a test patch printed by the two dies, a LAB corresponding to the die-to-die boundary can be detected as a peak in the value of L* plotted across the test patch. The size of a detected L* peak is proportional to the magnitude of the non-uniformity between dies, and therefore indicates the significance of the corresponding LAB.

The detected peak size is compared with predetermined uniformity values for a low drop weight uniformity, a nominal drop weight uniformity and a high drop weight uniformity, respectively, to identify a suitable pre-built LAB linearization table for adjusting the printing properties of the print head (i.e. by generating corresponding die-to-die boundary values $T_{boundary}$ in an actual linearization table T). For example, the drop volume of the nozzles at the corresponding die-to-die boundary can be adjusted according to the pre-built LAB linearization table so at to remove or reduce the magnitude of the detected LAB.

Also in FIG. 8, a detected peak size corresponding to a die-to-die boundary of a print head is depicted by a "X" marker to indicate its size relative to the die-to-die boundary values that the pre-built LAB linearization tables are calculated to compensate. This detected peak size is determined to be closest to nominal uniformity value. The pre-built nominal uniformity LAB linearization table (NomU_LAB) is therefore selected for adjusting the printing properties of the print head.

It will be appreciated that selection of only one of the pre-built LAB linearization tables may not necessarily completely remove the detected LAB since the detected peak may not exactly correspond to that which a selected pre-built LAB linearization tables is designed to compensate. For example, the detected peak size in FIG. 8 is larger than that of a nominal uniformity boundary by an amount denoted "F".

Thus, use of the pre-built nominal uniformity LAB linearization table (NomU_LAB) will not fully compensate the detected non-uniformity and will result in a finite non-uniformity between the corresponding die boundaries (i.e. a LAB).

As will already be understood from the method illustrated in FIG. 7, interpolation between two pre-built LAB linearization tables can be employed to further improve the compensation accuracy. That is, an interpolation factor may be used to interpolate between selected pre-built LAB linearization tables and produce an actual/final linearization table by modifying the printing properties of nozzles at the die-to-die boundary of the print head and leaving the printing properties of the nozzles outside of the die-to-die boundary unchanged.

Preferable embodiments of the invention will further include modifying the actual linearization table in the vicinity of the die-to-die boundary. In this way, a smooth transition may be made between the printing properties of the nozzles at a die-to-die boundary and the printing properties of nozzles distanced from the die-to-die boundary. It will be understood that one or more linearization tables may be used to implement such a transition smoothing procedure. For example, four linearization tables may be created to adjust the properties of the nozzles in the close vicinity of the die-to-die boundary, the applied linearization table or level of adjustment being dependent on how close a nozzle is to the die-to-die boundary.

Figure 9:
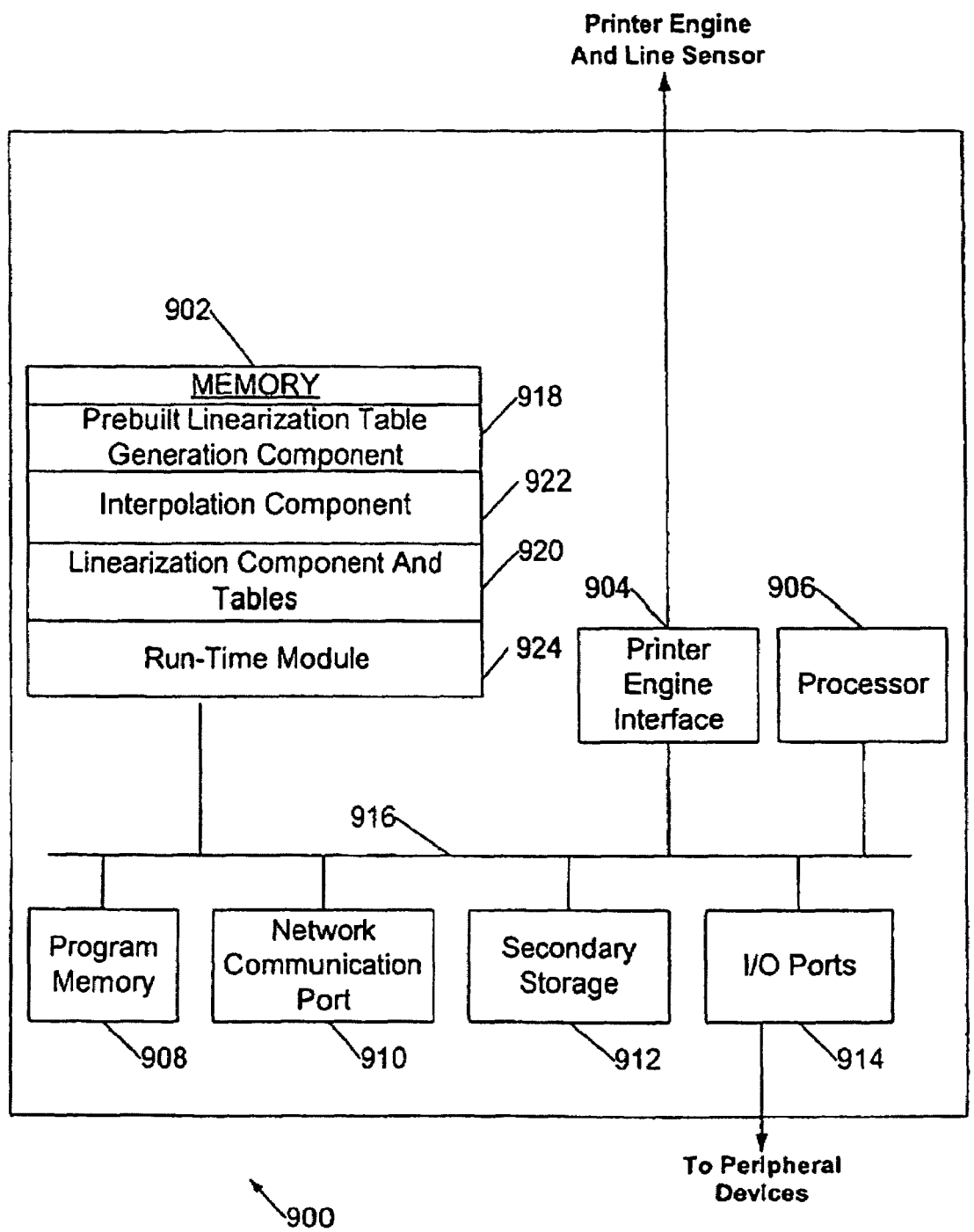
FIG. 9 is a block diagram of a system according to an embodiment of the invention.

FIG. 9 is a block diagram of a system used by one implementation of the present invention for calibrating a primary ink and printer combination. In this example, system 900 includes a memory 902, typically random access memory (RAM), a printer engine interface 904, a processor 906, a program memory 908 (for example, a programmable read-only memory (ROM) such as a flash ROM), a network communication port 910, a secondary storage 912, and I/O ports 914 operatively coupled together over bus 916. System 900 can be preprogrammed, in ROM, for example, or it can be programmed (and reprogrammed) by loading a program from another source (for example, from a floppy disk, a CD-ROM, or another computer).

Once initialized, memory 902 may include one or more aspects of the present invention. For example, pre-built linearization table generator 918 can be included in memory without the other components. This pre-built linearization generator 918 is typically used offline to generate pre-built LAB linearization tables and measurements at manufacturing works alone while 922 and 920 work together. Interpolation Component 922 facilitates measuring a test patch and interpolating the pre-built linearization tables to create an actual linearization table for a primary ink in a printer and print head combination. Linearization component and tables 920 performs the linearization and color compensation during printing to enhance the printing through improved color consistency and accuracy and run-time module 924 manages allocation of resources on system 900 while performing the one or more operations described above.

It will be understood that methods and apparatus according to embodiments of the invention may be employed within a computer processor and its associated memory, a printer, or a printing system or any combination thereof.

While specific embodiments have been described herein for purposes of illustration, various modifications will be apparent to a person skilled in the art and may be made without departing from the scope of the invention. Accordingly, the invention is not limited to the above-described implementations, but instead is defined by the appended claims in light of their full scope of equivalents.

I claim:

1. A method of calibrating a printer output at a die-to-die boundary of a print head, comprising:
    determining a measurement via a sensor related to drop weight uniformity at the die-to-die boundary of the print head;
    creating a graph by plotting the measurement related to drop weight uniformity against a displacement of the sensor;
    detecting one or more peaks and their respective sizes in the graph;
    comparing the one or more peak sizes with uniformity related measurements;
    selecting a linearization table from a set of linearization tables based on the comparing of the one or more peaks sizes to the uniformity related measurements; and
    adjusting the printing properties of the print head using the selected linearization table.

2. The method of claim 1, wherein the uniformity related measurements comprise low uniformity, nominal uniformity, and high uniformity measurements.

3. The method of claim 2, wherein selecting a linearization table comprises selecting two linearization tables from the set of linearization tables and interpolating the two selected linearization tables.

4. The method of claim 1, wherein a large peak size corresponds to a region of low uniformity between dies, and a small peak size corresponds to a region of high uniformity between dies.

5. The method of claim 1, wherein the measurement related to drop weight uniformity includes a measurement of optical density.

6. An apparatus for calibrating a die-to-die boundary of a print head having more than one die using linearization, wherein the apparatus comprises:
a sensor configured to determine a measurement related to drop weight uniformity at the die-to-die boundary of the print head;
a processor; and
a computer-readable storage medium having stored thereon, computer-executable instructions that, when executed by the processor, cause the apparatus to
create a graph by plotting the measurement related to drop weight uniformity against a displacement of the sensor;
detect one or more peaks and their respective sizes in the graph;
compare the one or more peak sizes with uniformity related measurements;
select a linearization table from a set of linearization tables based on the comparing of the one or more peaks sizes to the uniformity related measurements; and
adjust the printing properties of the print head using the selected linearization table.

7. The apparatus of claim 6, wherein the uniformity related measurements comprise low uniformity, nominal uniformity, and high uniformity measurements.

8. The apparatus of claim 7 wherein selecting a linearization table comprises selecting two linearization tables from the set of linearization tables and interpolating the two selected linearization tables.

9. The apparatus of claim 6, wherein the one or more peak sizes is proportional to the magnitude of the non-uniformity between dies.

10. The apparatus of claim 9, wherein a large peak size corresponds to a region of low uniformity between dies, and a small peak size corresponds to a region of high uniformity between dies.

11. The apparatus of claim 9, wherein each linearization table of the set of linearization tables is configured to provide a compensated output drop weight to allow printing with a substantially uniform drop weight across a die-to-die boundary of a print head.

12. The apparatus of claim 9, wherein the drop weight uniformity related measurements include measurements of optical density.

13. A computer-readable medium having stored thereon, computer-executable instructions that, when executed by a device, cause the device to perform a method comprising:
determining a measurement related to drop weight uniformity at a die-to-die boundary of a print head;
creating a graph by plotting the measurement related to drop weight uniformity against a displacement of a sensor;
detecting one or more peaks and their respective sizes in the graph;
comparing the one or more peak sizes with uniformity related measurements;
selecting a linearization table from a set of linearization tables based on the comparing of the one or more peaks sizes to the uniformity related measurements; and
adjusting the printing properties of the print head using the selected linearization table.

14. The computer-readable medium of claim 13, wherein the uniformity related measurements comprise low uniformity, nominal uniformity, and high uniformity measurements.

15. The computer-readable medium of claim 13, wherein selecting a linearization table comprises selecting two linearization tables from the set of linearization tables and interpolating the two selected linearization tables.

16. The computer-readable medium of claim 13, wherein the one or more peak sizes is proportional to the magnitude of the non-uniformity between dies.

17. The computer-readable medium of claim 13, wherein a large peak size corresponds to a region of low uniformity between dies, and a small peak size corresponds to a region of high uniformity between dies.

18. The computer-readable medium of claim 13, wherein each linearization table of the set of linearization tables is configured to provide a compensated output drop weight to allow printing with a substantially uniform drop weight across a die-to-die boundary of a print head.

19. The computer-readable medium of claim 13, wherein the drop weight uniformity related measurements include measurements of optical density.

* * * * *